US005115396A

United States Patent [19]

Keegan

[11] Patent Number: 5,115,396

[45] Date of Patent: May 19, 1992

[54] ACTUATION VALIDATION ALGORITHM

[75] Inventor: Kevin R. Keegan, Hilton, N.Y.

[73] Assignee: General Motors Corporation, Detroit, Mich.

[21] Appl. No.: 552,171

[22] Filed: Jul. 13, 1990

[51] Int. Cl.[5] ..................... G05B 13/04; F02D 41/04

[52] U.S. Cl. ..................... 364/431.04; 364/571.03; 364/151; 123/361; 123/399

[58] Field of Search ..................... 364/431.01, 431.07, 364/431.11, 424.03, 571.02, 571.03, 571.04, 571.05, 474.15, 148, 153, 154, 431.04, 151; 123/361, 399

[56] References Cited

U.S. PATENT DOCUMENTS 4,491,112 1/1985 Kenagae et al. .................. 123/479
4,519,361 5/1985 Murakami .................. 123/361 X
4,604,681 8/1986 Sakashita .................. 364/154
4,640,248 2/1987 Stoltman .................. 423/399
4,644,475 2/1987 Koyanagi .................. 364/431.07
4,711,218 12/1987 Kabasin .................. 364/431.07 X
4,779,597 10/1988 Takaku et al. .................. 364/431.11 X
4,854,283 8/1989 Kiyono et al. .................. 123/361
4,951,206 8/1990 Kyohzuka .................. 364/571.05 X

*Primary Examiner*—Parshotam S. Lall
*Assistant Examiner*—Thomas S. Auchterlonie
*Attorney, Agent, or Firm*—Howard N. Conkey

[57] ABSTRACT

An adaptive actuation verification method monitors the difference between a desired position and an actual position of a movable device, to ensure that the actual position of the device is approaching the desired position in an acceptable manner. A range of acceptable approaches is calculated based on the response capability of the movable device. The range is updated on-line to account for any changes in the response capability. An actuation fault is assumed when the device does not approach the desired position within the calculated range.

9 Claims, 4 Drawing Sheets

THROTTLE CONTROL INTERRUPT SERVICE — 60
DETERMINE COMMANDED THROTTLE ANGLE — 62
READ ACTUAL THROTTLE ANGLE — 64
CALCULATE THROTTLE ANGLE ERROR, $e_n$ — 66
EXECUTE THROTTLE CONTROL FAULT DETECTION ALGORITHM — 68
GENERATE MOTOR COMMAND SEQUENCE — 70
ISSUE MOTOR COMMAND — 72
RE-ENABLE THROTTLE CONTROL INTERRUPT — 74
RETURN TO BACKGROUND LOOP — 76

ACTUATION VALIDATION ALGORITHM

BACKGROUND OF THE INVENTION

This invention relates to a method for detecting faults in position control systems, and more specifically, for detecting faults when the actual position of a controlled state does not approach the desired position in a timely manner.

Motion control systems, which attempt to drive some movable device from some initial position to some desired position, typically have some means of determining when a fault exists in the system such that the movable device is not approaching the desired position appropriately. Generally, these systems attempt to discern between a low performance approach to the desired position and a faulty approach to the desired position. Low performance approaches may be forgiven, while faulty approaches must be diagnosed as faults and treated by some fault treatment scheme.

One such system in the prior art detects a fault when the magnitude of the difference between the desired motor position and the actual motor position exceeds a predetermined value for a predetermined time. All position errors are compared to the predetermined value and, if they exceed that value, they are given a predetermined amount of time to correct, or decrease to a magnitude smaller than the predetermined value. If they do not so correct, a fault is assumed to have occurred.

While this method, or variations of it, have been used extensively for the detection of faults in motion control systems, they have limitations. Small position errors, including those resulting from a system failure, that do not exceed the predetermined value are not detected by this system, and thus are always tolerated. This undesirable effect may be reduced by decreasing the magnitude of the predetermined value. However, such a decrease will increase the probability of assuming a fault when the system is operating normally. Such false alarms can result in the setting off of annoying alarms or can result in shutting down a "healthy" system.

Another limitation is the inability of this system to discriminate between the sources of the position error, and thus between the sources of the fault. A normal operating condition involving a large change in the position error caused by a large change in the desired motor position cannot be distinguished from an abnormal operating condition involving a large change in position error caused by a large, unexpected change in the actual motor position. In such conventional systems, conditions from either source are considered normal if they can be corrected within the predetermined time.

SUMMARY OF THE INVENTION

The subject invention overcomes the limitations of the prior systems by providing an adaptive variable position error limit beyond which the position error of a motor or of any movable device constitutes a fault.

Specifically, the error limit is based on the rate of change in desired position of the movable device. The magnitude of the limit is allowed to decay to zero over time, but will be reset to a value proportional to the new rate of change of the desired position any time the rate of change exceeds a value proportional toward the decaying limit. The position error of the movable device, which is the difference between the desired position of the movable device and the actual position of the movable device, is continually compared to the decaying error limit, and any excursion beyond the limit by the position error constitutes a fault condition and is subject to a fault treatment scheme.

The rate of decay of the error limit is derived from the response time of the system. That response time can change as the operating conditions of the system change. One aspect of the invention compensates for such changes by varying or adapting the rate of decay of the error limit in proportion to any relevant changes in operating conditions. Additionally, the system response time may vary depending on the direction of change in position. By establishing error limits with decay rates corresponding to each of the different directions of change in position, the differences in response can be compensated for, resulting in a fault detection system that intelligently decays the magnitude of the position error limit according to the response capability of the system.

The subject invention can be applied to any position control system with position feedback means. Unlike the discussed prior art, it can detect faults resulting from small steady-state position errors as its position error limit is not fixed, but decays to zero. Unlike the discussed prior art, it can distinguish between large normal position errors, or errors caused by changes in desired position, and large abnormal position errors from other sources. Large position errors caused by a change in desired position will cause the error limit to be reset to a large value, and thereby the large position error will not be diagnosed as a fault. However, when a large position error exists which is not the result of a large change in desired position, the system will not reset the error limit and the large position error will be properly diagnosed as a fault.

DESCRIPTION OF THE PREFERRED EMBODIMENT

Figure 1:
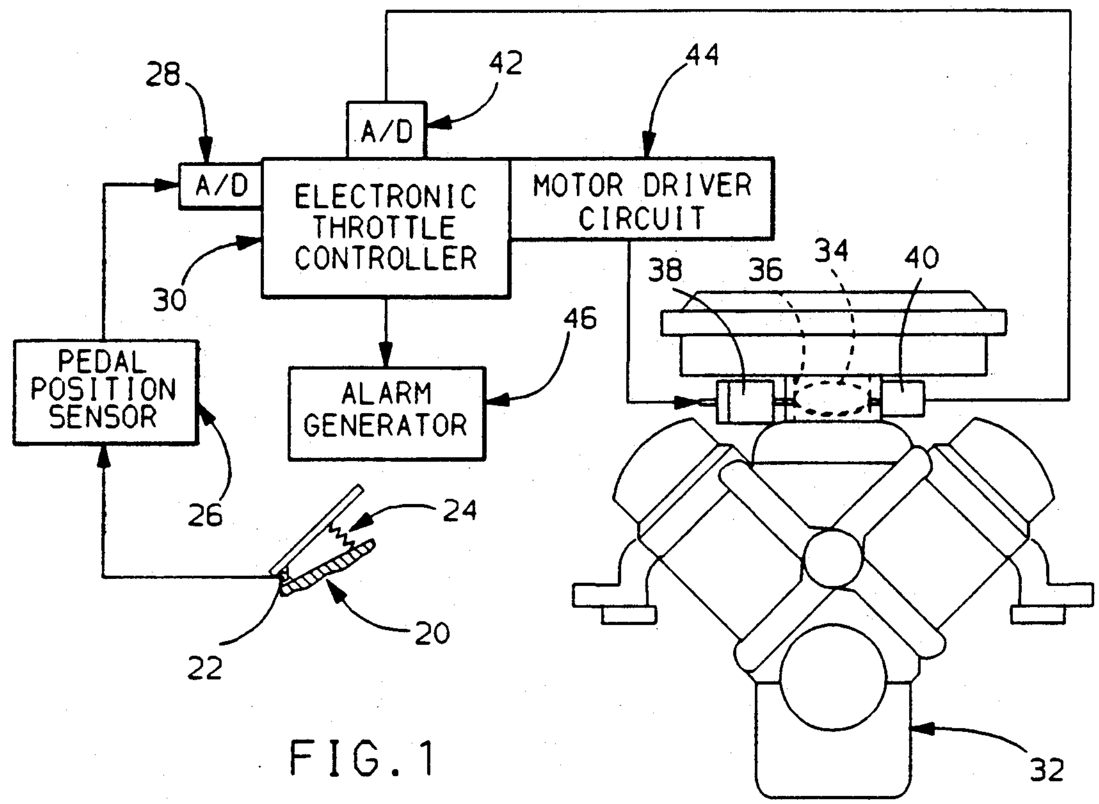
FIG. 1 is a diagram of an electronic throttle control system incorporating the principles of this invention.

Referring to FIG. 1, the air flow rate of an internal combustion engine 32 and thus the engine operating speed is controlled according to a command received from the operator of the engine. The operator applies a force to the accelerator pedal 20 tending to rotate the pedal about a pivot 22 to an off-idle position in opposition to a return force exerted by a spring 24 tending to rotate the pedal to an engine idle position. The pedal 20 rotates from its engine idle position to a displacement from the idle position that is proportional to the magnitude of the vehicle operator applied force opposing the force of the spring 24. To provide a measure of the displacement of the pedal 20 away from the engine idle position, a pedal position sensor 26 is attached to the pedal.

In this embodiment, the sensor 26 comprises at least one rotary potentiometer attached to the pedal 20 such that the wiper of the potentiometer rotates about its resistive track as the pedal rotates about its pivot. The voltage between the output pin of the potentiometer and a reference voltage is proportional to the angular displacement of the pedal 20 away from the engine idle position. That analog voltage is transmitted to an analog to digital converter 28, and the digital output of the converter is read and stored by the electronic throttle controller 30 as the commanded throttle blade angle.

Air is drawn through the throttle bore 36 of the engine 32, wherein a throttle blade 34 is located which controls the amount of air allowed into the engine. When the blade 34 is perpendicular to the direction of airflow through the bore 36, the bore is completely closed imposing the maximum restriction on air allowed into the engine 32. As the blade 34 is rotated away from its perpendicular position, an increasing amount of air is allowed into the engine 32. When the blade 34 is rotated ninety degrees from the perpendicular position, the maximum possible amount of air is allowed into the engine 32, as air can pass through the bore 36 with virtually no obstruction from the blade.

Springs are attached to the blade 34 so as to keep the blade at its perpendicular position when the system is turned off. This requires that the spring constant be large enough such that the spring force exceeds the detente torque of the motor and any frictional forces in the system that are present when the system is disabled.

The engine controller delivers a quantity of fuel to the engine 32 to be mixed with the air such that the proper fuel air ratio is maintained no matter how much air the operator has requested. Thus the amount of air allowed into the engine 32, based on the operator's applied force on the accelerator pedal 20, dictates the operating speed of the engine.

A D.C. servo motor, or any rotary actuator 38, is connected to the throttle blade 34 by a shaft, and rotates the blade according to a command received from the controller 30. The controller 30 transmits the command to the motor 38 via the motor driver circuit 44 which can be any standard motor driver circuit such as a D.C. motor driver circuit consisting of two p-channel FETS and two n-channel FETS arranged in a standard full h-bridge configuration. At least one rotary potentiometer 40 is also attached to the shaft, such that its wiper rotates with respect to its resistive track as the blade rotates with respect to the bore, to provide a measure of the angular position of the blade 34 with respect to the bore 36. The voltage between the potentiometer output pin and a reference signal is proportional to the angular displacement of the blade 34 away from the perpendicular position. The output pin of the potentiometer is connected to an analog to digital converter 42, which is connected to the electronic throttle controller 30. The controller 30 reads and stores the digital output signal from the converter 42 as the actual throttle blade angle. If the fault detection method incorporating the principles of this invention detects a fault in the system, the controller notifies the operator of the fault via the alarm generator 46, which can be a standard warning lamp in proximity to the operator.

The electronic throttle controller 30 takes the form of a standard digital computer, such as a Motorola MC68HC11 single chip microcomputer. The principles of this invention are implemented in the form of an operating program stored in the computer's memory.

Figure 2:
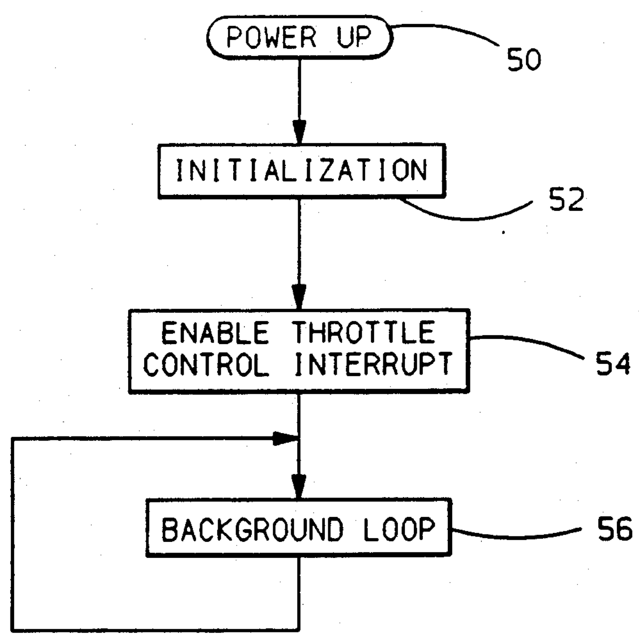
FIG. 2 through 4 are computer flow diagrams illustrating the operation of the throttle control system of FIG. 1 in carrying out the principles of this invention.

Referring to FIG. 2, when power is first applied to the system such as when the vehicle ignition switch is turned to its "on" position, the controller program is initiated at point 50 and then proceeds to step 52 where the controller provides for system initialization. For example, at this step data constants are transferred from ROM locations to RAM locations and counters, flags and pointers are initialized.

After the initialization step the controller proceeds to step 54, where the throttle control interrupt is set up. The controller then proceeds to a background loop at step 56 which is continuously repeated. This loop may include system diagnostic and maintenance routines. In the preferred embodiment of this invention, the controller interrupts its background loop every four milliseconds to execute the throttle control routine that incorporates the principles of this invention.

Figure 3:
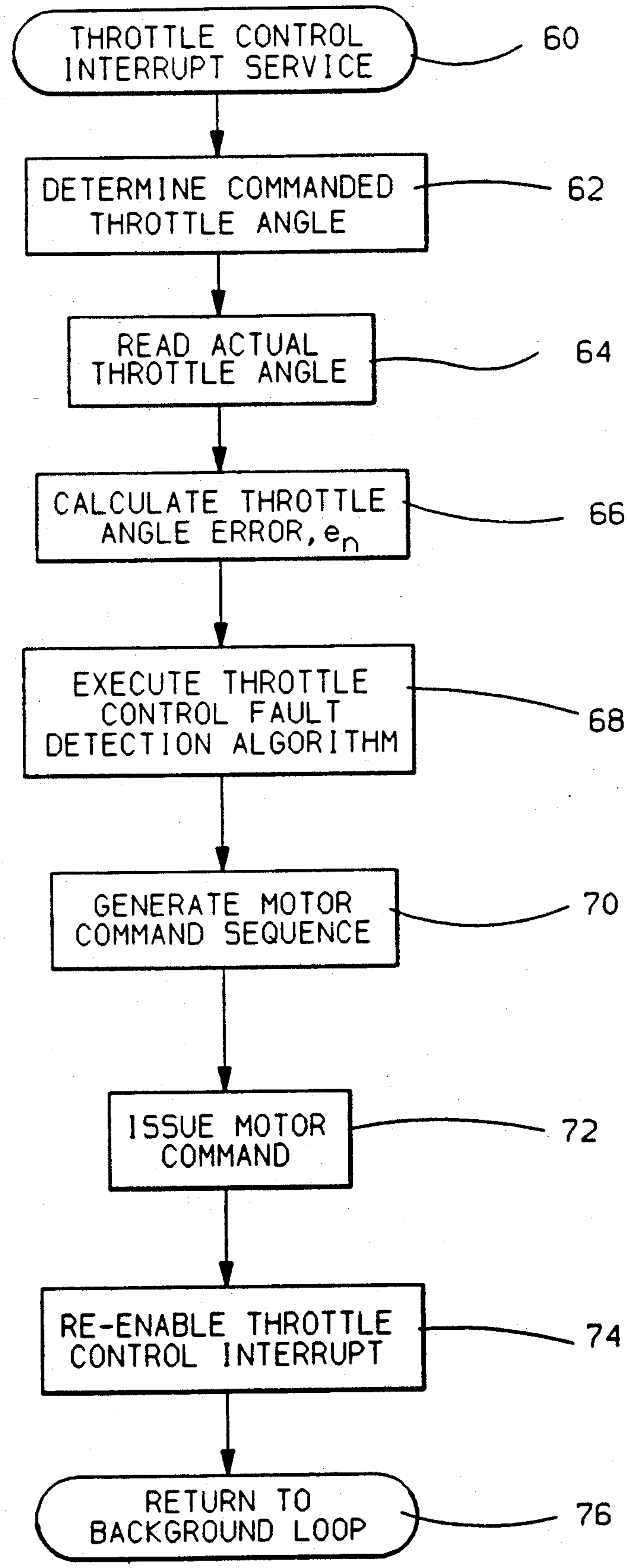

This throttle control routine is illustrated in FIG. 3, and is entered at step 60. It proceeds to step 62, where the commanded throttle angle is determined from the output of the pedal position sensor. Next, the actual angle of the throttle blade is read from the throttle position sensor at step 64. The throttle angle error for the present loop $e_n$ is then computed as the difference between the commanded throttle angle and the actual throttle angle at step 66.

The throttle control fault detection algorithm incorporating the principles of this invention is next executed at step 68. Next, at step 70, a motor electrical command sequence is derived as a function of the throttle angle error and of the present electrical state of the motor, to excite the motor in such a manner that the motor rotates the throttle blade from its present angular position to the commanded angular position, thereby driving the throttle blade angle error to zero. The command sequence is next transmitted to a standard D.C. motor driver circuit at step 72, where it is transformed into a command capable of driving the motor to the desired position.

The next step 74 services the throttle control routine interrupt for the next iteration of the routine, such that the next throttle control interrupt will occur at the predetermined time. Finally, at step 76, the controller returns to the background routine, which it will continuously repeat until the next throttle control interrupt.

In general, the disclosed invention compares the present throttle blade angle error to a derived limit of tolerable throttle angle error to verify that the throttle blade angle error is decreasing in magnitude in an acceptable manner.

Figure 4A:
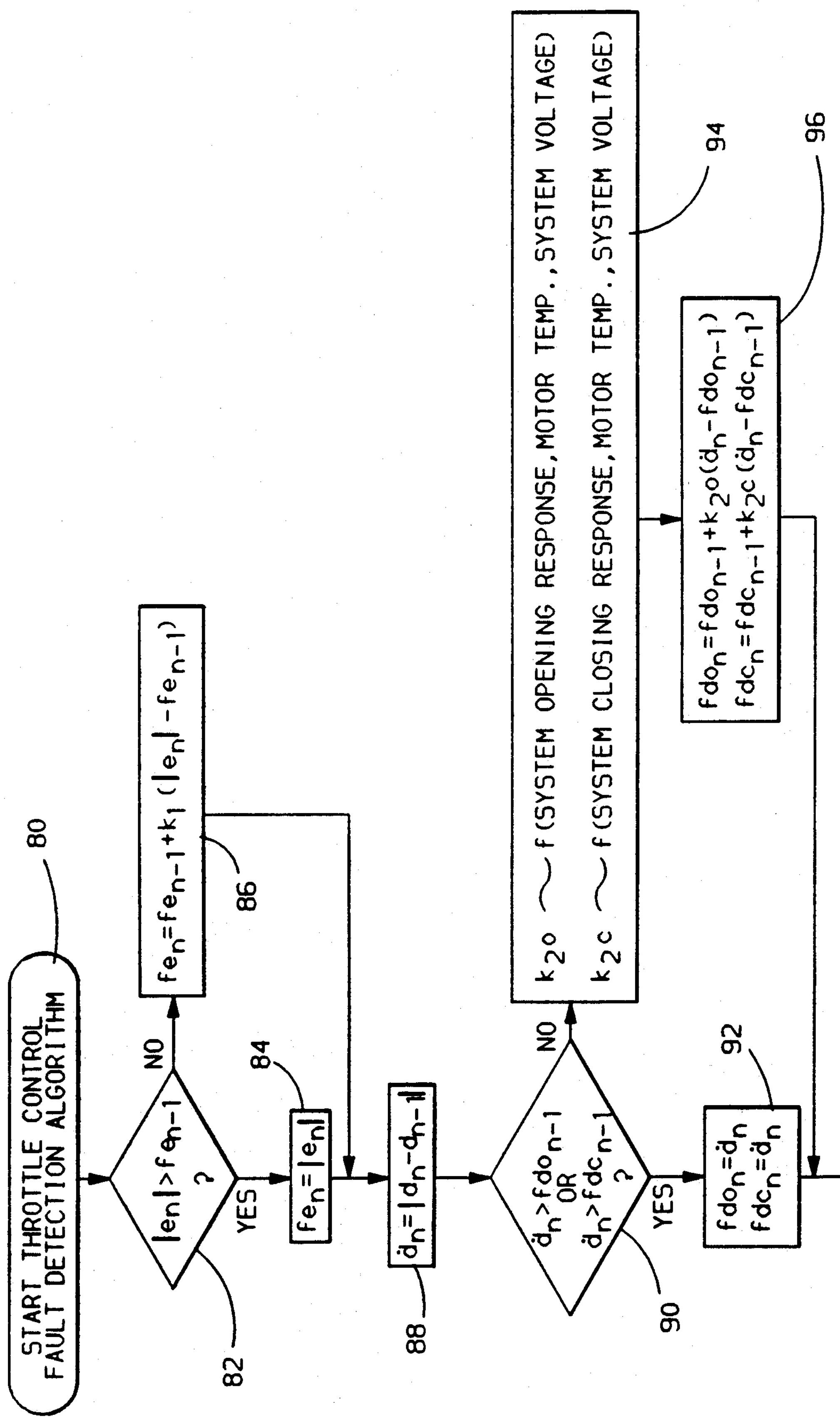
Figure 4B:
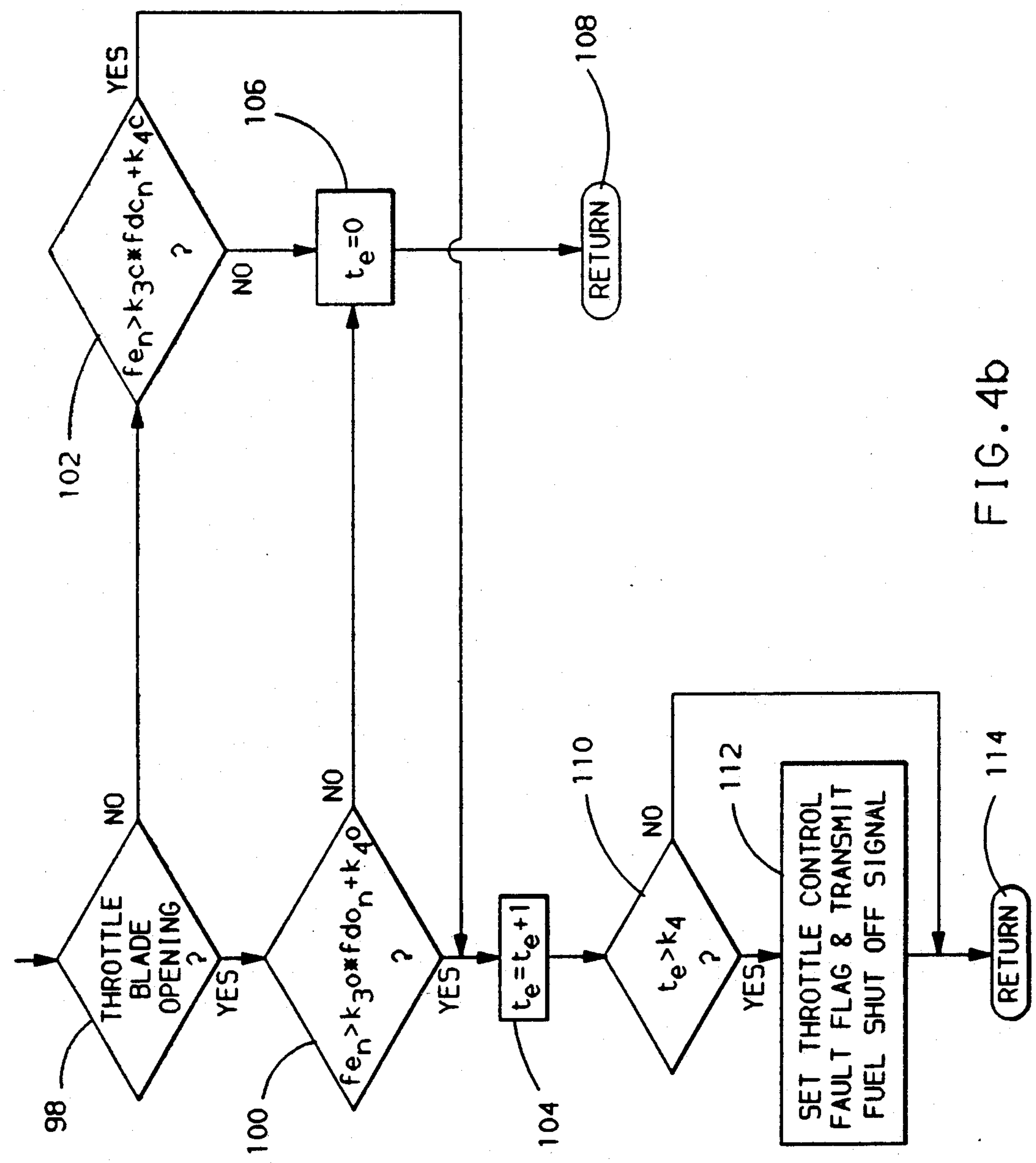

The steps executed by the electronic throttle controller during one iteration of this fault detection algorithm are illustrated in FIGS. 4*a* and 4*b*. In steps 80 through 84, the throttle angle error is filtered using a simple lag filter. This filter is intended to reduce the impact of sensor noise in the system, specifically noise from the throttle blade angle sensor.

At step 82, the throttle controller generates the absolute value of the throttle angle error $|e_n|$ and compares this absolute value to a filtered value of the throttle angle error from the previous iteration $fe_{n-1}$. The filtered value is reset to zero every time the processor is initialized. If $fe_{n-1}$ is less than $|en|$ then $fe_n$, the present filtered value of the throttle angle error, is set to $|e_n|$ at step 84. Otherwise, if $fe_{n-1}$ is greater than en then, at step 86, $fe_n$ is filtered by a first order lag filter according to the following equation $$fe_n = fe_{n-1} + K_1(|e_n| - fe_{n-1})$$

where $K_1$ is the lag filter coefficient. The absolute value of the derivative of the commanded throttle position $d_n$ is next calculated at step 88, according to the expression $$d'_n = |d_n - d_{n-1}|$$

where $d_n$ is the present sensed value of the commanded throttle angle, and $d_{n-1}$ is the sensed value of the commanded throttle angle for the previous iteration.

Steps 90 through 96 establish the value proportional to the error limit by either decaying that value or by resetting it, depending on system conditions. At step 90, $d\cdot_n$ is compared to the derivative of the commanded throttle position from the previous loop, which has been filtered in the opening direction of motion, $fdo_{n-1}$ and in the closing direction of motion, $fdc_{n-1}$. Both $fdo_{n-1}$ and $fdc_{n-1}$ are initialized to zero every time the engine is started up. If the assigned value of $fdo_{n-1}$ or the assigned value of $fdc_{n-1}$ is less than d n, then $fdo_n$, the present value of the derivative of the commanded throttle position filtered in the opening direction and $fdc_n$, the present value of the derivative of the commanded throttle position filtered in the closing direction are assigned the value of $d\cdot_n$ at step 92.

Otherwise, in the preferred embodiment, a decay constant is calculated for the opening direction of motion, $K_2o$, and the closing direction of motion, $K_2c$. $K_2o$ is derived as a function of the normal response time of the system to a change in the commanded throttle blade angle in the opening direction and $K_2c$ is derived as a function of the normal response time of the system to a change in the commanded throttle blade angle in the closing direction. These two coefficients are the basis for two corresponding decay trajectories. These trajectories are used to calculate two error limit values, one applicable to motion in the opening blade direction, and the other applicable to motion in the closing blade direction. This is intended to compensate for the difference in speed of response between the opening and closing direction of motion of the blade. This difference in response between the two directions is caused mainly by the torque from the return spring forcing the blade to its perpendicular position. Less torque is available to accelerate the motor in the opening direction as a substantial amount of the motor torque is expended in overcoming the return spring torque. However, in the closing direction of motion the return spring torque substantially contributes to the torque available to accelerate the motor, thereby increasing the response time of the motor to changes in the commanded throttle angle.

Compounding this hysteretic effect is the hysteresis in the efficiency of any gears used to transmit rotational force from the actuator to the blade, and any frictional hysteresis. By varying the position error limit between the two directions, this adaptive fault detection algorithm compensates for the response hysteresis.

Additionally, $K_2o$ and $K_2c$ are calculated as functions inversely proportional to the temperature of the actuator, and directly proportional to the voltage available to be applied to the actuator. When the temperature of the motor increases, increasing the resistance of the motor windings, or when the voltage applied to the motor decreases due to a failure in the motor electrical system or due to changes in the voltage demand from other devices in the system, the response time of the motor will increase. This is due to the decrease in available current caused by the voltage decrease or the resistance increase, which causes a decrease in the torque available to accelerate the motor. This on-line calculation of the decay coefficients at step 94 thereby tolerates the reduced system response due to changes in those operating conditions.

Next, $fdo_n$ and $fdc_n$ are contemporaneously decayed along their own first order lag trajectories at step 96 according to $$fdo_n = fdo_{n-1} + K_2O\,(d\cdot_n - fdo_{n-1})$$

$$fdc_n = fdc_{n-1} + K_2c\,(d\cdot_n - fdc_{n-1})$$

This method of decaying the $fdo_n$ and $fdc_n$ is the preferred method for modeling the actuator response to changes in the desired throttle angle. However, this single method should not be considered as limiting the invention as other methods have been contemplated by the inventors which provide functional models of the actuator response.

Returning to FIGS. 4*a* and 4*b*, steps 98 through 102 determine whether the throttle angle error has exceeded the error limit, which is proportional to the decaying value previously calculated. A check is first made at step 98 to determine the direction of the throttle blade motion. If the blade is opening (moving away from its perpendicular position) then $fe_n$ is then compared to the the opening position error limit which is the product of $fdo_n$ and a constant $K_3o$, plus a constant $K_4o$, at step 100. $K_3o$ and $K_4o$ are simple scaling constants used only to relate the magnitude of $fe_n$ to the magnitude of $fdo_n$.

If the blade is closing (moving to its perpendicular position), then $fe_n$ is compared to the closing position error limit which is the product of $fdc_n$ and $K_{3c}$ plus a constant $K_4c$, at step 102. $K_{3c}$ and $K_4c$ are simple scaling constants used only to relate the magnitude of $fe_n$ to the magnitude of $fdc_n$.

If, at step 100, $fe_n$ is greater than the error limit in the opening direction comparison or if, at step 102, fen is greater than the error limit in the closing direction comparison then there is an excursion from the tolerable error envelope, and an excursion counter, which is reset to zero on system power-up, is incremented at step 104. If $fe_n$ does not exceed the sum in the applicable direction comparison then there is no such excursion, the excursion counter is reset to zero at step 106, the present iteration of this algorithm is complete and the controller returns to the background loop at step 108.

If, at step 110, the excursion counter has counted up to a predetermined value such that the excursions have consistently occurred for an extended amount of time, then a failure is assumed to have occurred and a signal is sent to the main engine controller at step 112 to notify the operator of the failure and to shut off fuel. The algorithm is then complete, the controller returns at step 114 to the background loop, and the engine cannot be operated until it has been reinitialized, such as by a reset of system power. This treatment of the failure is designed to prevent operation of the engine when the blade is not responding appropriately to what are assumed to be valid motor excitation commands.

If the excursion counter has not reached that predetermined value, then no actionable fault has occurred, the present iteration of the algorithm is complete, and the controller at step 114 returns to the background loop.

The foregoing description of a preferred embodiment for the purpose of explaining the principles of this invention is not to be considered as limiting or restricting the invention since many modifications may be made by the exercise of skill in the art without departing from the scope of the invention.

The embodiments of the invention in which an exclusive property or privilege is claimed are defined as follows:

1. A method of detecting a fault condition in a control system which controls the position of a movable body from a present actual position to a commanded position, the method comprising the steps of:

measuring the present actual position of said movable body;

generating the commanded position of said movable body;

calculating the rate of change in the commanded position of said movable body;

establishing an error limit by (a) setting the error limit to a reset value which is a predetermined function of the calculated rate of change in the commanded position of said movable body when the reset value is greater than the error limit value and (b) decaying the error limit value by means of a predetermined decay rate when the reset value is less than the error limit value;

calculating the error in said position, said error comprising the difference between said commanded position and said actual position;

comparing said position error to said error limit;

indicating a fault condition when said position error exceeds said error limit.

2. The method of claim 1, wherein the step of decaying said error limit value further comprises the step of calculating said predetermined decay rate as a functional of normal response time of said control system to a change in said commanded position.

3. The method of claim 1, wherein the step of decaying said error limit value further comprises the steps of:

measuring operating conditions of said system that affect the response time of said system to a change in said commanded position;

calculating said decay rate as a function of said operating conditions.

4. The method of claim 3, wherein the step of measuring said operating conditions and the step of calculating said decay rate further comprises:

measuring system voltage and system temperature;

calculating said decay rate as a function inversely proportional to system temperature and directly proportional to system voltage.

5. An apparatus for detecting a fault condition in a commanded throttle angle tracking system in an internal combustion engine, comprising:

a throttle blade seated in the bore of the air inlet of said engine, said blade being rotatable with respect to said bore to control the amount of air allowed into said engine;

rotational actuating means connected to said blade to rotate said blade with respect to said bore;

blade angle commanding means for commanding a blade angle of said blade with respect to said bore, corresponding to a desired amount of air to be allowed into said engine;

means for determining the rate of change of said blade angle command from said blade angle commanding means;

actuator control means for controlling said actuating means to rotate said blade to an angle corresponding to said commanded blade angle from said blade angle commanding means;

blade angle measuring means connected to said blade to measure the angular displacement of said blade with respect to said bore;

blade angle error computing means for computing the blade angle displacement error, said error comprising the difference between said commanded blade angle and said measured blade angle;

error limit determining means for determining limit an error value of said blade angle error, comprising (a) means for resetting said error limit to a reset value that is a function of said rate of change of said commanded throttle angle when said reset value is greater than said error limit value, and (b) means for decaying said error limit value when said reset value is less than said error limit value, said decaying means having a rate of decay proportional to a normal response time of the system to changes in said commanded throttle angle;

comparing means for comparing said blade angle error to said error limit;

fault signaling means for indicating a fault condition when said blade angle error exceeds said error limit.

6. The fault detecting apparatus of claim 5, wherein the means for decaying said error limit value further comprises:

means for sensing those operating conditions of said system that affect the response time of said system to changes in said commanded throttle angle;

means for calculating said decay rate as a function of said sensed operating conditions.

7. The fault detecting apparatus of claim 5, wherein the means for decaying said error limit value further comprises:

means for measuring the temperature of said actuating means;

means for measuring the voltage applied to said actuating means;

means for calculating said decay rate as a function inversely proportional to the temperature of said actuating means, and directly proportional to the voltage applied to said actuating means.

8. A method of detecting a fault condition in a control system which controls the position of a movable body from a present actual position to a commanded position in both a forward and reverse direction of motion, the method comprising the steps of:

measuring the present actual position of the movable body;

generating the commanded position of the movable body;

calculating the rate of change in the commanded position of the movable body;

establishing a first and second error limit value by (a) setting both the first and second error limit values to one common reset value that is a predetermined function of the rate of change of said commanded position when the reset value exceeds the first or second error limit values, (b) decaying the first error limit value according to a first decay rate and the second error limit value according to a second decay rate when the reset value is less than both the first and second error limit values, the first decay rate being related to a first normal response time of the system to changes in the commanded position of the movable body in the forward direction of motion, and the second decay rate being related to a second normal response time of the system to changes in the commanded position of the movable body in the reverse direction of motion;

calculating the error in said position, said error comprising the difference between said commanded position and said actual position;

indicating the existence of a fault when the position error exceeds the magnitude of the first error limit value when the movable body is moving in the forward direction of motion: and indicating the existence of a fault when the current position error exceeds the magnitude of the second error limit value when the movable body is moving in the reverse direction of motion.

9. An apparatus for detecting a fault condition in a commanded throttle angle tracking system in an internal combustion engine, comprising:

a throttle blade seated in the bore of the air inlet of said engine, said blade being rotatable with respect to said bore to control the amount of air allowed into the engine;

rotational actuating means connected to said blade to rotate said blade with respect to said bore;

blade angle commanding means for commanding a blade angle of said blade with respect to said bore, corresponding to a desired amount of air to be allowed into said engine;

means for determining the rate of change of said blade angle command from said blade angle commanding means;

actuator control means for controlling said actuating means to rotate said blade to an angle corresponding to said commanded blade angle from said blade angle commanding means;

blade angle measuring connected to said blade to measure the angular displacement of said blade with respect to said bore;

blade angle error computing means for computing the blade angle displacement error, said error comprising the difference between said commanded blade angle and said measured blade angle;

means for establishing continuously varying first and second error limit values, comprising means for resetting both the first and the second limit value to a common reset value that is a predetermined function of the rate of change of the commanded throttle angle when said reset value exceeds the first or the second error limit value, (b) means for decaying the first error limit value according to a first decay rate and the second error limit value according to a second decay rate when the reset value is less than both the first and second error limit values, the first decay rate being related to a first normal response time of the system to changes in the commanded throttle angle requiring motion of the throttle blade in an opening direction with respect to the bore, and the second decay rate being related to a second normal response time of the system to changes in the commanded throttle angle requiring motion of the throttle blade in a closing direction with respect to the bore;

means for comparing said-throttle angle error to said first error limit value when said blade is moving in the opening direction;

means for comparing said throttle angle error to said second error limit value when said blade is moving in the closing direction;

means for signaling a fault when said throttle angle error exceeds said first error limit value when said blade is moving in said opening direction; and means for signaling a fault when said throttle angle error exceeds said second error limit value when said blade is moving in said closing direction.

* * * * *